United States Patent
Engel et al.

(10) Patent No.: US 11,135,709 B2
(45) Date of Patent: Oct. 5, 2021

(54) BRAKE CALIPER TOOL

(71) Applicant: A&E Incorporated, Racine, WI (US)

(72) Inventors: Bruce J. Engel, Milwaukee, WI (US); Jeffrey J. Kuzmic, Wind Lake, WI (US); Billy Greuel, Waterford, WI (US); Jason Horner, Burlington, WI (US)

(73) Assignee: A & E INCORPORATED, Racine, WI (US)

(*) Notice: Subject to any disclaimer, the term of this patent is extended or adjusted under 35 U.S.C. 154(b) by 336 days.

(21) Appl. No.: 16/407,725

(22) Filed: May 9, 2019

(65) Prior Publication Data

US 2020/0353608 A1 Nov. 12, 2020

(51) Int. Cl.
*B25B 27/00* (2006.01)
*B25B 5/06* (2006.01)
*F16D 65/00* (2006.01)

(52) U.S. Cl.
CPC .......... *B25B 27/0021* (2013.01); *B25B 5/068* (2013.01); *B25B 27/0035* (2013.01); *F16D 65/0043* (2013.01)

(58) Field of Classification Search
CPC ............. B25B 27/0035; F16D 65/0043; Y10T 29/53648; Y10T 29/53683; Y10T 29/53796; Y10T 29/53909
See application file for complete search history.

(56) References Cited

U.S. PATENT DOCUMENTS

| | | | |
|---|---|---|---|
| 1,339,448 | A | 5/1920 | Forsman et al. |
| 2,170,535 | A | 8/1939 | Marsden |
| 2,650,735 | A | 9/1953 | Redmond |
| 3,835,522 | A | 9/1974 | Ward |
| 4,744,132 | A | 5/1988 | Greene et al. |
| 5,018,261 | A | 5/1991 | Markous |
| 5,269,053 | A | 12/1993 | Hicks |
| 5,829,739 | A | 11/1998 | Hofmann |
| 6,085,398 | A | 7/2000 | Arch |
| 6,192,566 | B1 | 2/2001 | Dunum |
| D457,795 | S | 5/2002 | Mohammed et al. |
| 6,523,238 | B1 | 2/2003 | Priddy |
| 6,574,846 | B1 | 6/2003 | Kang |
| 6,678,931 | B1 | 1/2004 | Tatasciore |
| 6,925,696 | B1 | 8/2005 | Williams |
| 7,155,792 | B1 | 1/2007 | Miller |
| 7,996,972 | B2 | 8/2011 | Chih |

(Continued)

OTHER PUBLICATIONS

A&E Incorporate drawing sheet entitled Disc Brake Tool with Wrench; Part No. DV-3251; dated Feb. 21, 2011.

(Continued)

*Primary Examiner* — Tyrone V Hall, Jr.

(74) *Attorney, Agent, or Firm* — Ryan Kromholz & Manion, S.C.

(57) ABSTRACT

A tool for retracting pistons into cylinder bores is disclosed, with a narrow gap between facing pressure plates allowing use of the tool in tight places, and ratcheting spreading of the facing pressure plates causing outward moving of the pistons, enabling work to be performed. One of the pressure plates is reversible to change the minimum narrow gap from a first width to a second width. In each of the orientations, the plates are movable towards and away from one another.

1 Claim, 4 Drawing Sheets

(56) References Cited

U.S. PATENT DOCUMENTS

| | | | |
|---|---|---|---|
| 8,393,063 B2 | 3/2013 | Hodges | |
| 8,505,177 B2 | 8/2013 | Chen | |
| 8,621,692 B1 | 1/2014 | Kring | |
| 8,661,638 B2 | 3/2014 | Chen | |
| 8,661,639 B2 | 3/2014 | Bondielli | |
| 8,826,504 B1* | 9/2014 | Slivon | B25B 27/0035 29/239 |
| 9,174,330 B2 | 11/2015 | Chen | |
| 9,309,937 B2 | 4/2016 | Chen | |
| 9,376,300 B2 | 6/2016 | Yang | |
| 9,683,620 B2 | 6/2017 | Buchanan | |
| 9,695,893 B2 | 7/2017 | Huang | |
| 2003/0141644 A1* | 7/2003 | Thomas | B25B 5/163 269/6 |
| 2004/0123438 A1 | 7/2004 | Kang | |
| 2004/0134052 A1 | 7/2004 | Ploeger et al. | |
| 2005/0000073 A1 | 1/2005 | Ploeger et al. | |
| 2011/0010906 A1* | 1/2011 | Mitchell | F16D 65/0043 29/239 |
| 2011/0179616 A1 | 7/2011 | Oachs et al. | |
| 2012/0108112 A1 | 5/2012 | Vernica | |
| 2012/0204393 A1 | 8/2012 | Gentner et al. | |
| 2018/0335097 A1* | 11/2018 | Dahl | B25B 27/0035 |

OTHER PUBLICATIONS

Alltools WA Pty Ltd: Online Shop; Disc brake pad spreader; .alltools.com.au/shop/index.php/556/2453-Disc-Brake-Pad-Spreader; Jul. 16, 2010.

Snap-on; Pad Spreader, ://buy1.snapon.com/catalog/printPage.asp?tool=all&item-id=12411&PartNo=YA244; Dec. 10, 2010.

Snap-on; Press, Break Piston, ://buy1.snapon.com/catalog/printPage.asp?tool=all&item-id=72215&PartNo=BT350'; Dec. 10, 2010.

Snap-on; Press, Break Caliper, ://buytsnapon.com/catalog/printPage.asp?tool=all&item-id=88695&PartNo=BTCP1; Dec. 10, 2010.

Snap-on; Spreader (for standard 4-piston caliper disc brakes); ://buy1.snapon/catalog/printPage.asp?tool=all&item-id=12412&PartNo=GA395; Dec. 10, 2010.

Snap-on; Tool, Universal Break Caliper, Left Hand Thread, ://buy1.snapon/catalog/printPage.asp?tool=all&item-id=75281&PartNo=YA642; Dec. 10, 2010.

The Tool Warehouse, CalVan Tools 700 Heavy-Duty Universal Disc Brake Pad Spreader; .the toolwarehouse.net/shop/media/TN-CAL-700.jpg; Jul. 3, 2008.

Toolfetch; CalVan Tools 700 Heavy-Duty Universal Disc Pad Spreader; .toolfetch.com/Catagory/Automotive/Brake-Tools/CAL700.htm; Jul. 16, 2012.

* cited by examiner

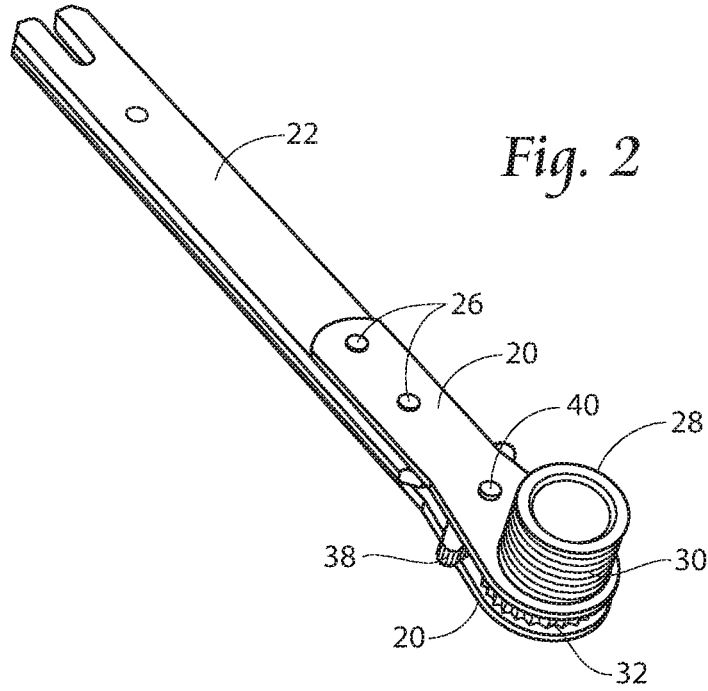

BRAKE CALIPER TOOL

BACKGROUND OF THE INVENTION

In the repair of vehicle braking systems having disc brakes, various special tools are desirable. Disc brakes typically include a caliper housing which is positioned adjacent a vehicle wheel assembly having a rotor or brake disc rotatably mounted therewith. The caliper housing is associated with at least one piston which moves back and forth in a cylinder, and includes a pair of opposed brake pads for clamping the rotor in response to movement of the piston. When a vehicle operator activates a foot brake or a handle brake, brake fluid is forced from, a master cylinder into the cylinder associated with the caliper housing to push the piston(s), and force engagement of the brake pads against the rotor to stop rotation of the wheel. When linings of the brake pads are worn too thin under a certain thickness after a period of use, the brake pads are required to be replaced with new ones to maintain a proper braking force during driving. However, with a continuous wearing to the linings of the brake pads, the piston gradually travels outwardly into the interior of the caliper housing to make the space of accommodating the brake pads progressively narrower. In such circumstances, the caliper housing is typically removed from the wheel assembly for the vehicle, and a special tool is used to spread the brake pads apart and/or to force or press the piston(s) back to an initial position in the cylinder(s) after which the brake pads can be replaced. The caliper housing can then be reinstalled in the wheel assembly and positioned with the new brake pads adequately accommodated in the caliper housing for engagement with the rotor.

A variety of spreader and brake press tools are known to be used by mechanics responsible for the repair of disc brakes and the replacement of brake pads. A difficulty with these tools, however, is the manual effort often required to effect retraction of the one or more pistons associated with the caliper housing. Accordingly, there remains a need in servicing brake pads to provide a tool for effectively retracting the one or more pistons of various caliper housing designs with improved mechanical advantage and ease of use.

SUMMARY OF THE INVENTION

The present disclosure relates to a disc brake piston retractor tool for retracting at least one piston into at least one cylinder bore of a caliper assembly provided with a set of brake pads to be serviced.

A plate of the disc brake piston retractor tool is reversible in order to decrease the minimum width between two plates of the disc brake piston retractor tool. In one orientation, the reversible plate provides a minimum width between the two plates, and in the other orientation, the reversible plate provides a maximum width between the two plates. In each of the orientations, the plates are movable towards and away from one another.

The plates of the present invention nest securely within the caliper. With the reversible plate feature of the present invention, it is possible to minimize the minimum spread of the plates in one plate configuration, and maximize the maximum spread of the plates in a reversed plate configuration.

BRIEF DESCRIPTION OF THE DRAWINGS

FIG. 1 is a perspective view of portions a disc brake caliper tool according to the present invention.

FIG. 2 is an exploded view of the portions of the brake caliper tool of FIG. 1.

DESCRIPTION OF THE PREFERRED EMBODIMENT

Figure 3:
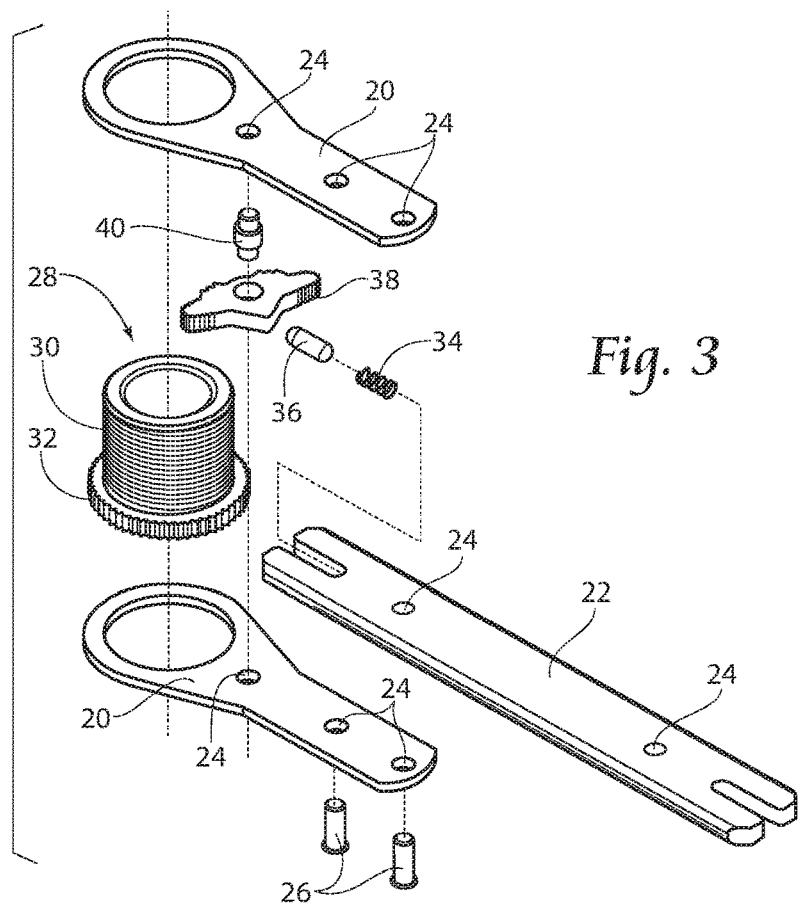
FIG. 3 is a perspective view of a fully assembled disc brake caliper tool according to the present invention.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Referring now to FIG. 1, a disc brake piston retractor tool 10 used for compressing one or more pistons 74 (See FIGS. 6, 7) into a caliper housing 70 (See FIGS. 6, 7) when replacing a set of brake pads installed therein is shown. A pair of plates 50, 60, are operably spread and retracted by operating ratchet handle 42, carried by spacer 22. A first contoured plate edge 62 and a second contoured plate edge 64 are present on plates 50 and 60.

Referring now particularly to plate 50, plate 50 has two sides, 50*a* and 50*b*. Side 50*b* carries spacer nut 54. As will be described later, plate 50 is reversible in order to change the maximum and minimum separation distance between plates 50 and 60. The pressure plates 50, 60 are substantially identical in shape and thickness and are preferably constructed of steel. In some circumstances, such as placing the plates 50 and 60 in tight places, it is preferable to have a smaller minimum distance between the plates. In other circumstances, it is preferable to have larger separation distance between the plates 50 and 60.

Referring now to FIGS. 2 and 3, the tool 10 is generally constructed of a spacer 22 carrying a pair of tool plates 20 by rivets 26 interconnected by rivet holes 24. A reversible and extended pawl 38 is coupled via a rivet shoulder 40 between spacer flats 20. A fine tooth ring 32, for engaging the pawl 38, is also carried between tool flats 20 by rivet shoulder 40. Spring coil 34 and pin plunger 36 react between the pawl 38 and the teeth 32. One of the tool flats 20 carries a threaded member 28 comprising threads 30. Fine teeth 32 on an outer surface of the threaded member 28 interact with the pawl 38 and controls advancing and retracting of the plates 50 and 60, and pawl 38 can be switched in position to control direction, as is known in the art.

Figure 4:
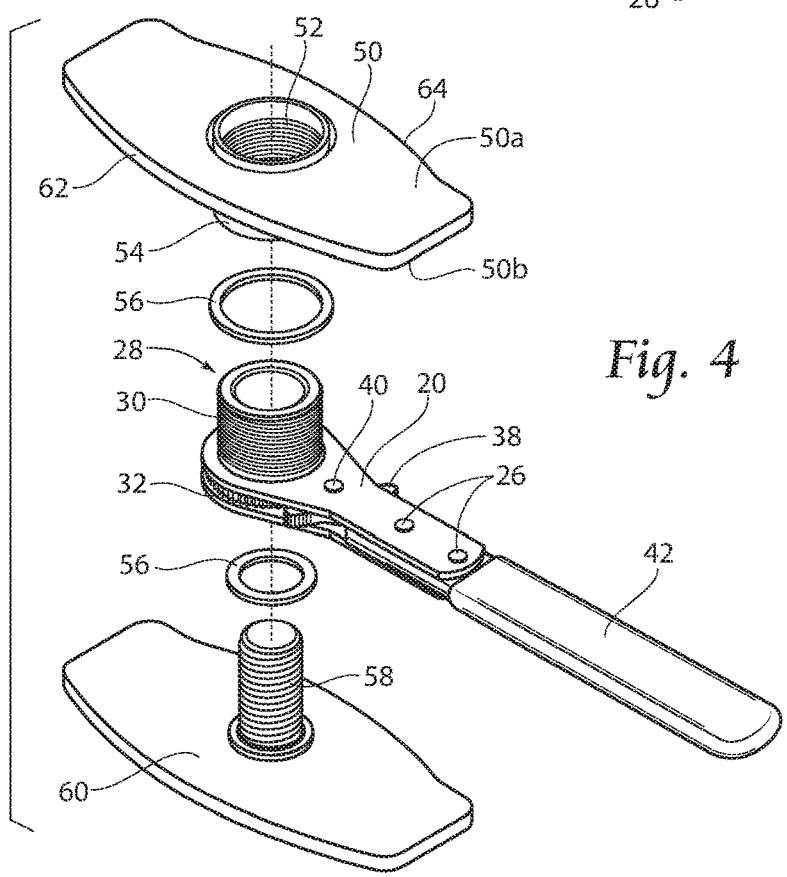
FIG. 4 is an exploded view of the tool shown in FIG. 3.

Referring now to FIG. 4, side 50*b* of first pressure plate 50 carries spacer nut 54 with internal threads 52, for coupling with threads 30 of ring 28. A pair of washers 56 are provided for spacing. Carried by plate 60, an exterior threaded stud 58 threads through washers 56, through threaded member 28, and engages interior threads 52 of member 54. It is noted that threads 52 accept exterior threaded stud 58 threads whether in a first orientation or a second orientation (member 54 facing inward or outward). This allows reversibility of plate 50.

Figure 5:
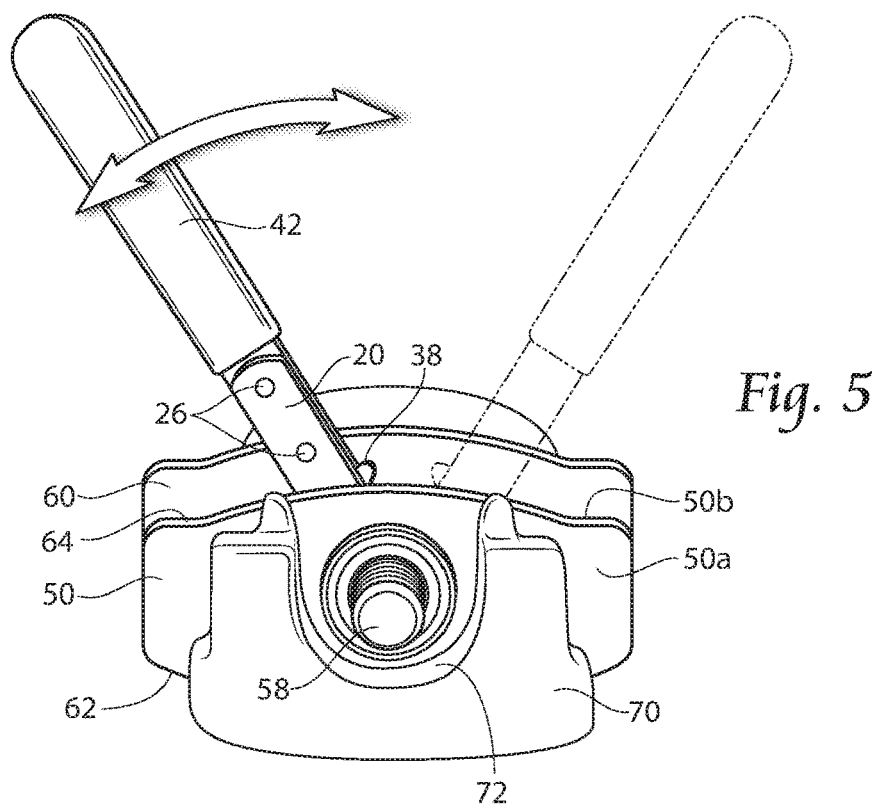
FIG. 5 is an in-use view of the tool shown in FIG. 3.
Figure 6:
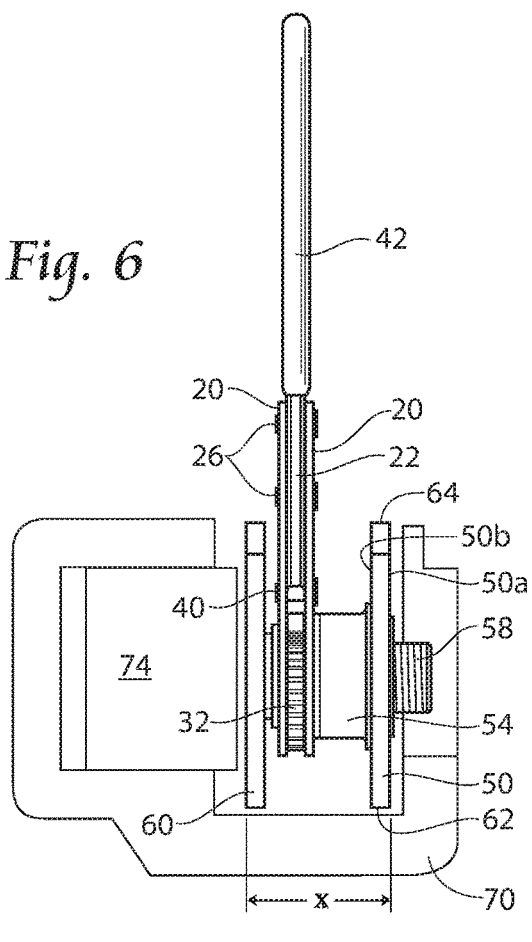
FIGS. 6 and 7 illustrate side views of the tool of FIG. 5 in use.
Figure 7:
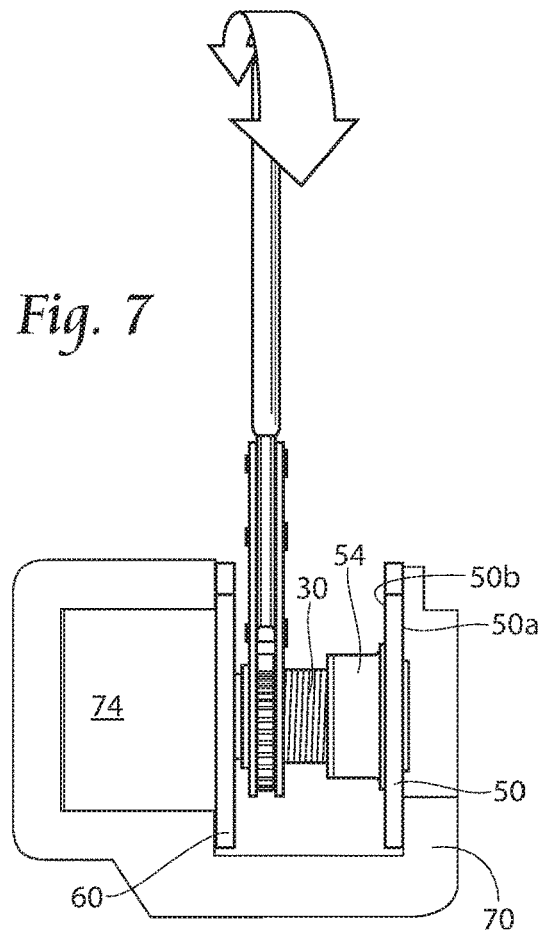

Referring now to FIG. 5, the reversible ratchet wrench assembly 10 shown is operated similarly to that shown in U.S. Pat. No. 8,826,504, incorporated herein by reference. Handle 42 can move to advance or retract plates 50 and 60 relative to one another, depending on pawl 38 position. Referring now to FIGS. 6 and 7 in side view, as the plates 50 and 60 separate, piston 75 is pressed within brake caliper 70. On the caliper 70, a void space 72 accommodates threaded stud 58. In the arrangement shown in FIG. 6, with side 50b facing inwardly, nut 54 also faces inwardly (toward the piston 75, for instance). In this arrangement, the minimum spacing between plates 50 and 60 is a distance X. As plates 50 and 60 separate by operating handle 42, as shown in FIG. 7, the piston 74 is forced inwardly.

Figure 8:
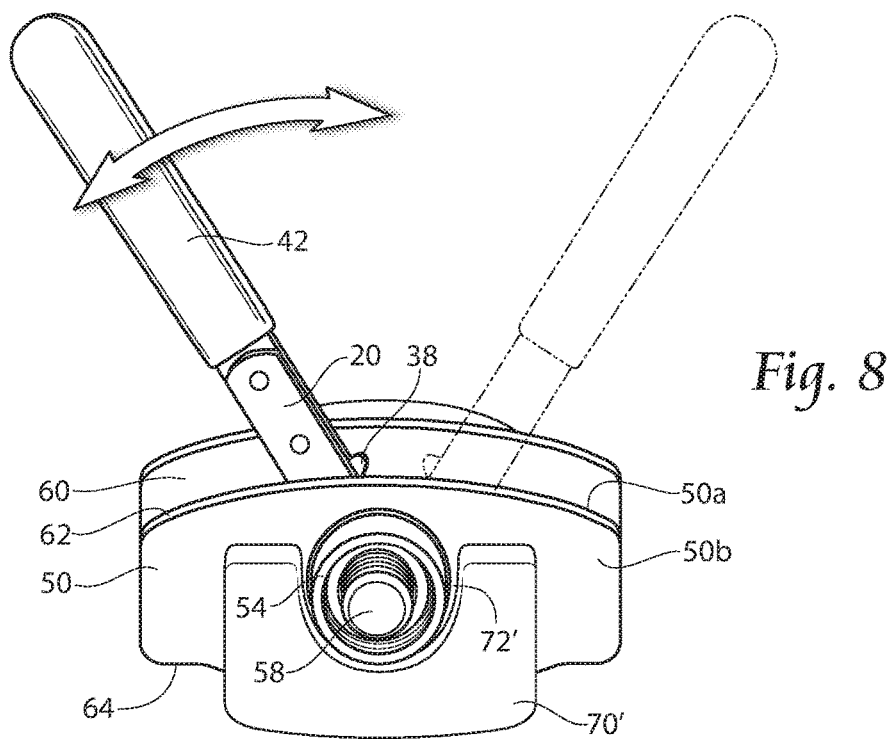
FIG. 8 is a perspective view of a fully assembled disc brake caliper tool according to the present invention, with one of the plates in a reversed orientation.
Figure 9:
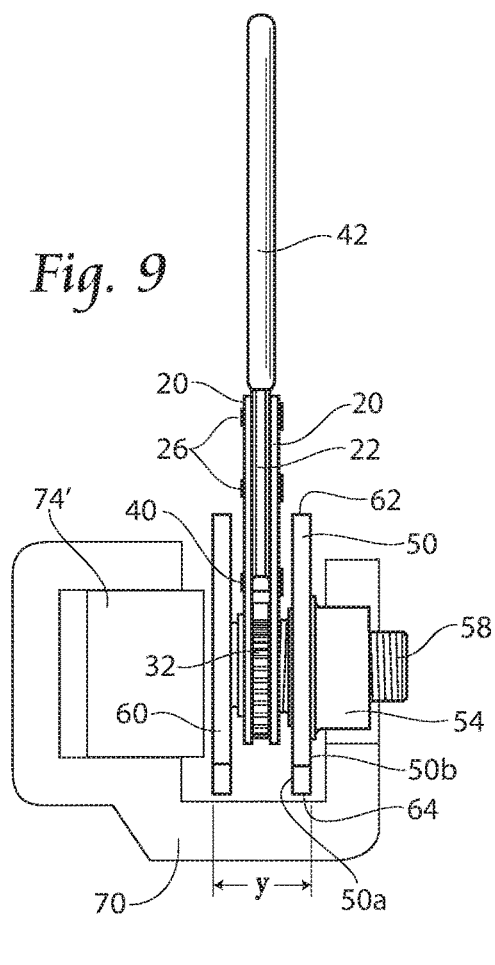
FIGS. 9 and 10 illustrate side views of the tool of FIG. 8 in use.
Figure 10:
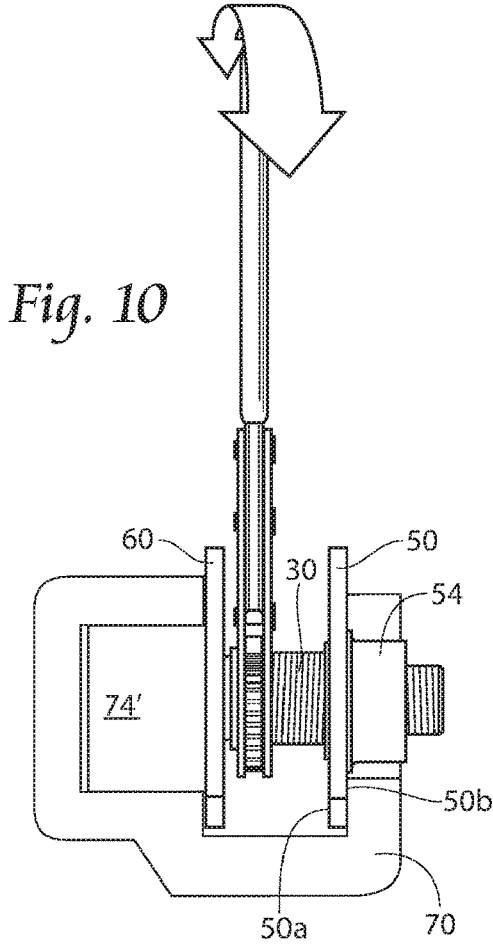

Referring now generally to FIGS. 8-10, plate 50 has been removed from stud 58 and reversed, such that side 50b now faces outwardly, nut 54 also faces outwardly (away from the piston 75, for instance). In this arrangement, the minimum spacing between plates 50 and 60 is a distance Y, less than distance X. As plates 50 and 60 separate by operating handle 42, as shown in FIG. 7, the piston 74 is forced inwardly.

Although not illustrated, it should be understood that certain caliper housings are designed with one set of pistons on one wall, and another set of pistons on another wall spaced from the one wall so that the sets of pistons are spaced apart and face each other. In this case, the tool 10 is placed in the caliper housing such that one pressure plate 50 or 60 is designed to push against and retract the one set of pistons into their respective cylinder bores, and the other pressure plate is designed to push against and retract the other set of pistons into their respective cylinder bores.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:

1. A disc brake piston retractor tool for retracting at least one piston into at least one cylinder bore of a caliper assembly provided with a set of brake pads to be serviced, the tool comprising:
   a first and a second pressure plate operable in response to a reversible ratcheting wrench assembly, at least one of said first and second pressure plates reversible from a first orientation to a second orientation, with a minimum distance between said first and second pressure plates variable between said first orientation and said second orientation.

* * * * *